United States Patent [19]

Springmann

[11] 4,019,314
[45] Apr. 26, 1977

[54] HIGH PRESSURE GASIFICATION OF COAL USING NITROGEN DILUTION OF WASTE GAS FROM STEAM GENERATOR

[75] Inventor: Helmut Springmann, Geretsried, Germany

[73] Assignee: Linde Aktiengesellschaft, Wiesbaden, Germany

[22] Filed: Jan. 27, 1976

[21] Appl. No.: 652,772

[30] Foreign Application Priority Data

Jan. 27, 1975 Germany .......................... 2503193

[52] U.S. Cl. ............................ 60/39.02; 48/197 R; 48/206; 60/39.12; 252/373
[51] Int. Cl.² ............................................. F02C 3/22
[58] Field of Search ................ 48/197 R, 206, 215; 60/39.02, 39.12, 39.46 R; 252/373

[56] References Cited

UNITED STATES PATENTS

| | | | |
|---|---|---|---|
| 2,423,527 | 7/1947 | Steinschlaeger ................... | 60/39.02 |
| 3,307,350 | 3/1967 | Squires .............................. | 60/39.02 |
| 3,704,587 | 12/1972 | Krieb et al. ....................... | 60/39.12 |
| 3,709,669 | 1/1973 | Marion et al. ...................... | 48/215 |
| 3,728,093 | 4/1973 | Cofield ............................. | 48/197 R |
| 3,779,695 | 12/1973 | Chamberlain ................ | 60/39.46 G |
| 3,868,817 | 3/1975 | Marion et al. .................... | 60/39.02 |
| 3,882,671 | 5/1975 | Nebgen ............................ | 60/39.02 |
| 3,886,733 | 6/1975 | Connell ........................ | 60/39.46 R |

*Primary Examiner*—S. Leon Bashore
*Assistant Examiner*—Peter F. Kratz
*Attorney, Agent, or Firm*—Millen & White

[57] ABSTRACT

In a process for the production of a fuel gas by the pressure gasification of carbon-containing fuels with oxygen and steam, wherein the oxygen is manufactured in a low temperature air separation plant and the steam is formed in a gas-heated steam boiler, and the waste gases produced in the steam boiler are subsequently expanded in an expansion turbine, the improvement which comprises admixing the nitrogen produced during the air separation with the waste gases before the expansion of the latter.

12 Claims, 3 Drawing Figures

HIGH PRESSURE GASIFICATION OF COAL USING NITROGEN DILUTION OF WASTE GAS FROM STEAM GENERATOR

BACKGROUND OF THE INVENTION

This invention relates to high pressure gasification of carbon-containing fuels, e.g., coal, with oxygen and steam, and in particular to a process wherein the oxygen is produced in an air separation plant and the steam is formed in a gasheated steam generator, e.g., a boiler, and the waste gases produced in the steam boiler are subsequently expanded in an expansion turbine.

In conventional high pressure gasification processes, either air or oxygen-enriched air is utilized in addition to the steam. (For details of such processes, attention is directed to the comprehensive literature, for example, Riegel's Handbook of Industrial Chemistry, 7th edition, Ed. J. A. Kent, Van Nostrand Reinhold Company, New York, 1974, pp. 44-54 and references cited on p. 61, especially von Fredersdorff, C. G. an Elliott, M.A., "Coal Gasification. Chemistry of Coal Utilization", Suppl. Vol., H.H. Lowry Ed., pp. 892-1022, New York, John Wiley and Son, 1963.) The heating value of the fuel gas formed by high pressure gasification increases in proportion to the oxygen content of the oxygen-containing stream. For this reason, in order to produce a fuel gas having a high heating value, an air separation plant is employed to produce a highly enriched oxygen stream.

To provide the heat necessary for steam generation, either coal or, in the present case, part of the fuel gas product is burned with air. The resultant combustion gases (hereinafter termed "waste gases"), which are still under pressure, are subsequently expanded to recover the compression energy contained therein.

The steam boiler and the air separation plant are conventionally operated in parallel and substantially independently of each other. In such processes, however, it has heretofore been impossible to attain an entirely satisfactory energy balance.

SUMMARY OF THE INVENTION

An object of the present invention is to provide a process for the pressure gasification of carbon-containing fuels which operates with improved efficiency regarding energy consumption.

Upon further study of the specification and appended claims, further objects and advantages of this invention will become apparent to those skilled in the art.

These objects are attained in accordance with the invention by admixing the nitrogen produced in the air separation plant with the waste gases prior to the expansion of the latter.

The nitrogen, withdrawn at ambient temperature from the air separation plant, is heated during this admixing step, since the temperature of the waste gases, e.g., usually about +800 to +1000° C. prior to expansion is still close to the relatively high temperature ambient in the boiler. The thus-heated nitrogen yields an amount of energy during the subsequent expansion which is larger than the amount of energy which would otherwise be liberated during the expansion of the cold nitrogen. The heating of the nitrogen by admixing is also advantageous as compared to the supplying of heat thereto in a heat exchanger since the pressure losses caused by a heat exchanger are avoided during a mixing step. Futhermore, since this admixing procedure is conducted before the waste gases enter the expansion turbine, it is possible to lower the waste gas temperature so that the thermal load on the turbine is not excessive.

If the waste gas temperature does not exceed the value maximally permissible for the turbine, usually about +500° up to +800° C., then an admixture of the cold nitrogen before the expansion of the waste gases is unnecessary from this standpoint. In such a case, it is advantageous to effect the expansion of the waste gases in two stages and to admix the nitrogen to the waste gases between the two expansion steps. In this connection, it is advantageous in most cases to expand the waste gases in the first expansion stage to the pressure of the nitrogen, i.e. the waste gases are generally expanded from about 10 to 20 bars to about 5 to 10 bars in the first stage and then to about 1.2 to 5 bars in the second stage (all pressures being absolute.)

It is furthermore advantageous for the mechanical energy gained during the expansion of the waste gases and the nitrogen to be utilized for compressing the air required in the process.

The steam required in the gasification process is generated in a steam boiler. To supply fuel to the boiler, a minor portion of the fuel gas obtained as the product can be branched off for heating the steam boiler. Another possibility is to produce fuel gas required for heating the steam boiler in an auxiliary gasifier charged with carbon-containing fuels and operated with compressed air and steam. Since the auxiliary gasifier is operated with air instead of with oxygen, the amount of hot waste gases and thus the energy recovered during the waste gas expansion are correspondingly increased.

For economical usage of the compressors for the air compression, it is advantageous to operate the auxiliary gasifier at the upper pressure level of the air separation plant, i.e. generally about 10 to 20 bars. In comparison, the main gasifier is usually operated at a pressure of 8 to 12 bars.

Any conventional low temperature air separation plant can be employed, it being preferred however to utilize the system described in "Chemie-Ingenienr-Technik", Vol. 46 (1974), p. 885, FIG. 11, right.

In addition to the advantageous possibility of using the heat of reaction liberated in the auxiliary gasifier, a further feature is provided in the two stage expansion of waste gases, wherein the waste gases, after the first expansion are warmed in heat exchange with the gas produced in the auxiliary gasifier, and are then admixed with the nitrogen prior to the second expansion stage.

In the final analysis, the energy savings obtained by the warming and expansion of the air nitrogen, as compared to the conventional mode of operation are very significant. In addition, further savings are obtained by the use of an air-operated auxiliary gasification inasmuch as the nitrogen contained in the air required for the auxiliary gasification is expanded in the waste gas expansion turbines (just as the nitrogen obtained from the air separation plant) at a temperature which is far higher, usually 500° to 800° C., than the temperature at which the air is compressed, usually at ambient temperature.

Figure 1:
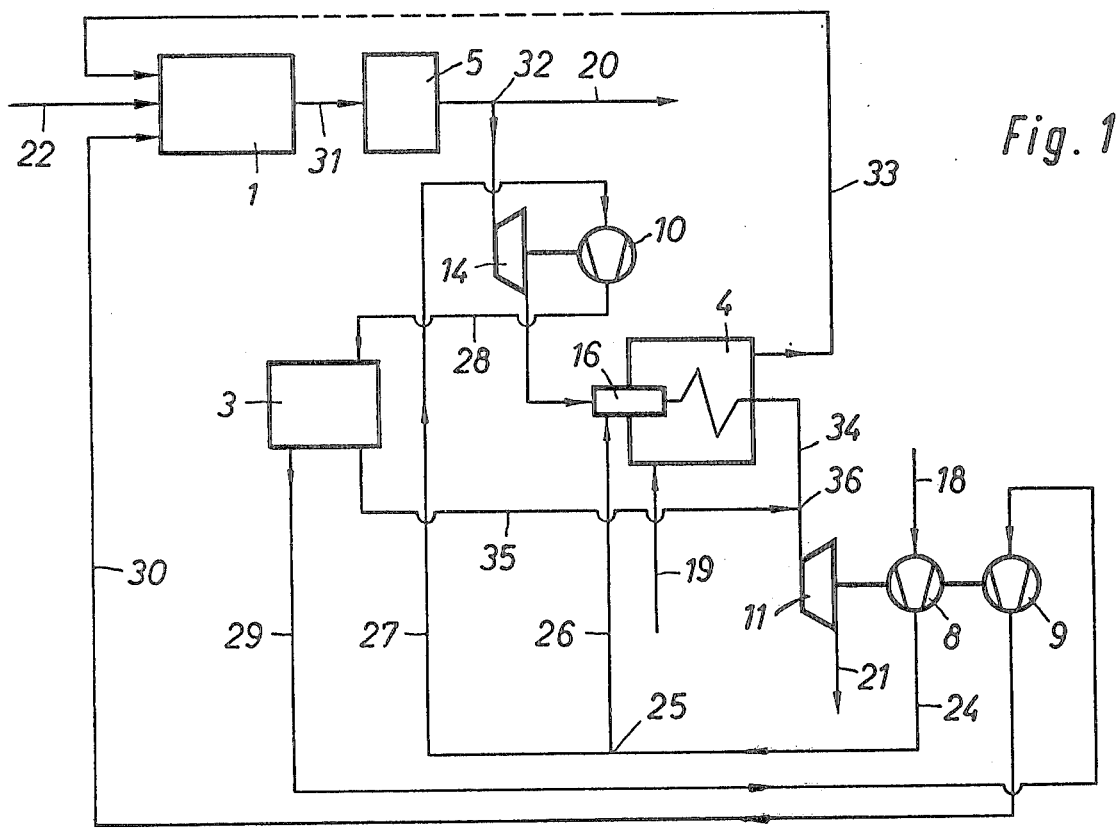
FIG. 1 is a schematic flowsheet of a process having a single-stage expansion of the waste gases and without an auxiliary gasifier.

In general, the volumetric ratio of low temperature nitrogen to the waste gas in the mixture thereof is about 0.5 : 1 to about 5 : 1, preferably 2 : 1 to 5 : 1.

DETAILED DESCRIPTION OF PREFERRED EMBODIMENTS

The elements common to all three illustrated processes are denoted by identical reference numerals.

In the Figures, 1 is a gasifier, 2 is an auxiliary gasifier, 3 is an air separation plant and 4 is a steam boiler. Numerals 5, 6 and 7 denote scrubber-coolers, 8 is an air compressor, 9 is an oxygen compressor, and 10 is another air compressor, while 11, 12 and 13 are expansion turbines for the waste gases of the steam boiler, and 14 and 15 are expansion turbines for the fuel gases produced during the gasification and intended for the steam boiler. Numeral 16 denotes the burner serving for heating the steam boiler.

In the process of FIG. 1, air at 18 enters air compressor 8 where it is compressed to about 7 bars. The air is then passed via conduit 24 to point 25 where a portion is branched off and conducted via conduit 26 to the burner 16 of the steam boiler 4. The other portion passes via conduit 27 to a second air compressor 10 where it is further compressed, for example, to 17–20 bars, and it is thereafter passed via conduit 28 to the air separation plant 3. The oxygen obtained from the plant 3 is passed via conduit 29 into the oxygen compressor 9, where it is compressed from about 5–6 bars to the pressure of gasifier 1 of about 25–30 bars, and is thereupon fed via conduit 30 to the gasifier 1.

The coal to be gasified is introduced at 22, and the steam required for this purpose is introduced into the gasifier via conduit 33. The fuel gas produced during the gasification consists essentially of hydrogen, carbon monoxide, and carbon dioxide. This fuel gas is conducted via conduit 31 into the scrubber-cooler 5 where it is freed of carbon dioxide and cooled from, for example, about 600° to about 200° C. The fuel gas, which now consists essentially of hydrogen and carbon monoxide, is withdrawn from the plant at 20 as the product gas.

A portion of the product fuel gas is branched off at 32, expanded in the expansion turbine 14 to about 6–7 bars, and burned with the compressed air fed via conduit 26 to the burner 16 of the steam boiler 4. The thus-liberated heat of combustion is transferred by indirect heat exchange to the water entering the steam boiler at 19; this water is withdrawn as steam via conduit 33 and, after compression to about the same pressure as the compressed oxygen in line 30, is introduced into the high pressure gasifier 1. The waste gases formed during the combustion in burner 16 and containing predominantly carbon dioxide, nitrogen, and steam, the temperature of which is, for example, about 820° C., and the pressure of which is, for example, 15 bars, are withdrawn by way of conduit 34 and admixed with the cold nitrogen withdrawn via conduit 35 from the air separation plant thereby lowering the temperature of the waste gases to about 500° C. The admixture of gases is then expanded to atmospheric pressure in expansion turbine 11 and withdrawn as exhaust gas via conduit 21. The energy obtained during the expansion of this gaseous mixture exceeds the amount which would otherwise be obtained from the expansion of the two individual components.

Suitably, the energy obtained during the expansion processes in the expansion turbines 11 and 14 is utilized directly for the compression of the air and/or oxygen utilized in the process, as indicated in FIG. 1 by the coupling of the turbines 11 and 14, respectively, with the compressors 8, 9 and 10.

Figure 2:
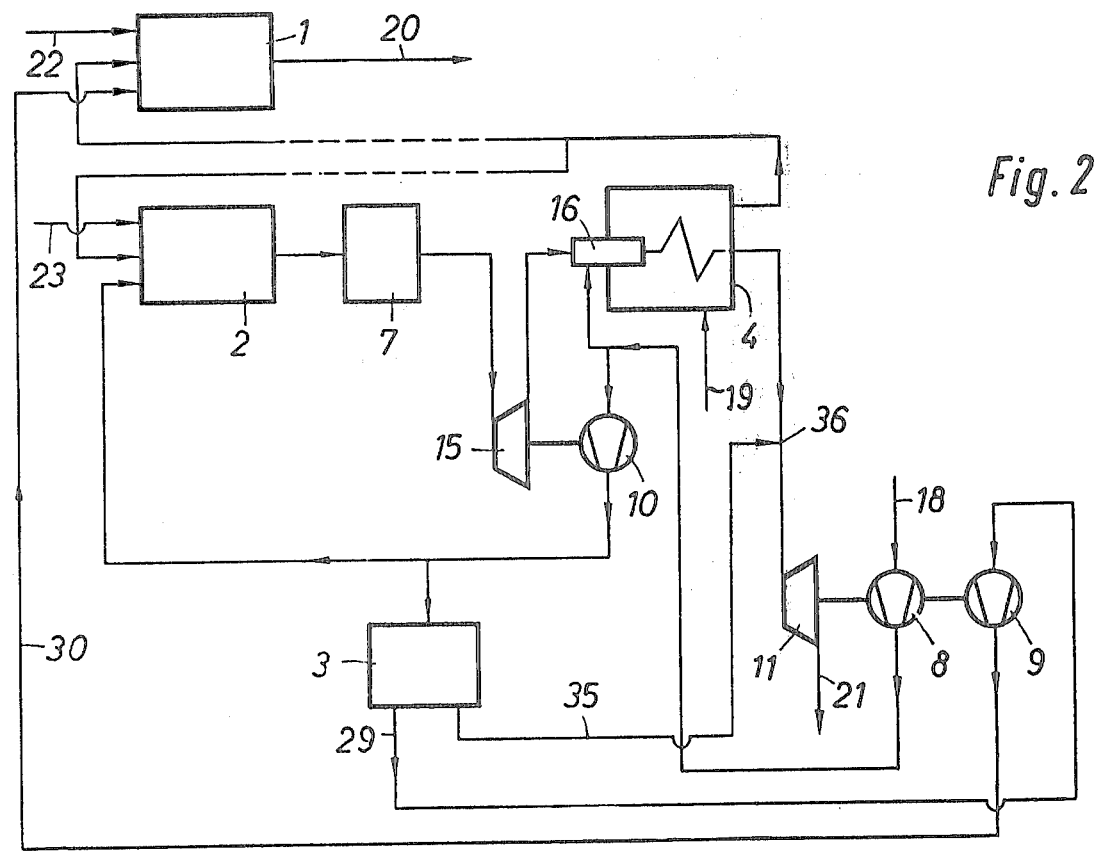
FIG. 2 is a schematic flowsheet of a process with an auxiliary gasifier and a single-stage expansion of the waste gases.

In the process according to FIG. 2, an air-operated auxiliary gasifier 2, fed with coal via conduit 23, is utilized in addition to the gasifier 1. In the gasifier 2, there are produced fuel gases required for heating the steam boiler 4. The air to be fed to the auxiliary gasifier and the air separation plant is compressed, in compressors 8 and 10, in two stages to a pressure of, for example, about 20 bars. After the first compression, at a pressure of about 7 bars, a portion of the air is branched off as combustion air for the burner 16 of the steam boiler 4. There is burner 16, the combustion air is mixed with the fuel gases exiting from the auxiliary gasifier which were treated in the scrubber-cooler 7 and in the expansion turbine 15. The waste gases of this combustion are admixed with the cold nitrogen from the air separation plant, and then expanded to atmospheric pressure in the expansion turbine 11. The steam produced in the steam boiler is fed to both the gasifier 1 and the auxiliary gasifier 2 after compression to the corresponding pressures thereon. The gasifier 1 is operated with the oxygen obtained from the air separation plant 3, and the auxiliary gasifier 2 is operated with a fraction of the air compressed in compressor 10.

Figure 3:
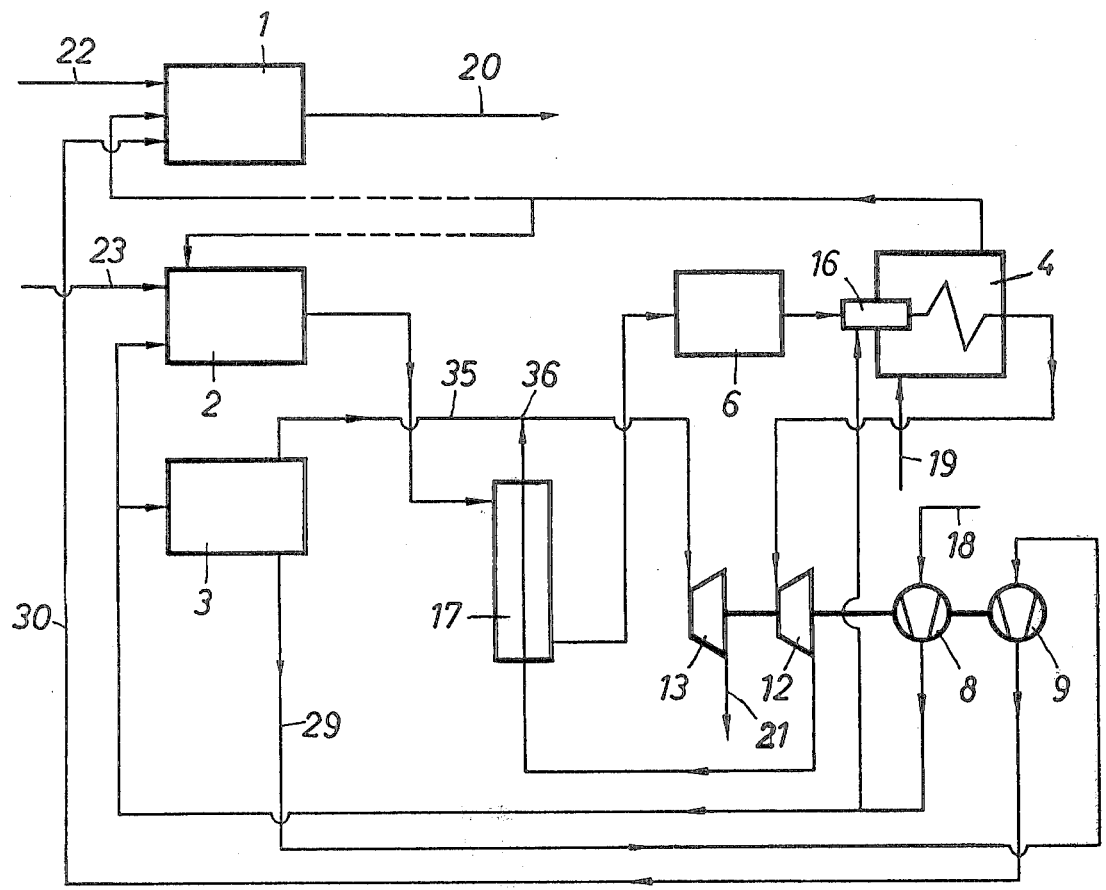
FIG. 3 is a schematic flowsheet of a process with auxiliary gasifier and a two-stage expansion of the waste gases, as well as an indirect heat exchange between the gas formed in the auxiliary gasifier and the waste gases between the two expansion stages.

The process of FIG. 3 differs from that of FIG. 2 by the utilization of the two-stage feature of the waste gas expansion in expansion turbines 12 and 13 as well as by the heat exchange in heat exchanger 17 between the fuel gas produced in the auxiliary gasifier 2 and the waste gas after the first expansion. Said heat exchange provides the advantage that part of the heat of reaction liberated in the auxiliary gasifier is not dissipated in the scrubber-cooler. Instead, this non-dissipated heat reheats the waste gases after the first expansion, so that additional energy can be gained during the second expansion after the reheated waste gases are admixed with the nitrogen at point 36.

To exemplify the process of FIG. 3, 2,600,000 Nm³/h. of air is required to produce 292,000 Nm³/h. of fuel gas having a heating value of about $10^{10}$ Btu of this amount, about 1,000,000 Nm³ of air is fed to the air separation plant, producing 160,000 Nm³ of oxygen and 840,000 Nm³ of nitrogen. The oxygen is fed to the gasifier 1; the residual 1,600,000 Nm³ of air is distributed between the auxiliary gasifier 2 and the burner 16 of the steam boiler. In the latter, 580 tons/hour of high-pressure steam is produced, of which 80 tons is utilized in the auxiliary gasifier 2 and 500 tons in the gasifier 1. The waste heat of the gasifier 1 serves for the generation of 600 tons/hour of high-pressure steam (not shown in the figures), which, together with the 500 tons from the steam boiler, is fed into the gasifier 1. From the mixture of the fuel gas produced in the auxiliary gasifier (freed of carbon dioxide) and the supplied air, 1,900,000 Nm³/h. of waste gas is formed in the burner of the steam boiler and this amount is expanded together with the 840,000 Nm³ of nitrogen.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a fuel gas by the pressure gasification of carbon-containing fuels with oxygen and steam, wherein the oxygen is manufactured in a low temperature air separation plant and the steam is formed in a gas-heated steam boiler, and the waste gases produced in the steam boiler are subsequently expanded in an expansion turbine, the improvement which comprises admixing the nitrogen produced during the air separation with the waste gases before the expansion of the latter.

2. A process according to claim 1, wherein the expansion of the waste gases is conducted in two stages and the nitrogen is admixed to the waste gases between the two expansion stages.

3. A process according to claim 2, wherein the waste gases are expanded in the first expansion stage to the pressure of the nitrogen leaving the air separation plant.

4. A process according to claim 1, wherein mechanical energy obtained during the expansion of the admixture of waste gases and nitrogen is utilized for compressing the air required in the process.

5. A process according to claim 1, wherein a portion of the fuel gas obtained as the product is branched off for heating the steam boiler.

6. A process according to claim 1, wherein the gas required for heating the steam boiler is produced in an auxiliary gasifier charged with carbon-containing fuels and operated with compressed air and steam.

7. A process according to claim 6, characterized in that the auxiliary gasifier is operated at the upper pressure level of the air separation plant.

8. A process according to claim 6, wherein the expansion of the waste gases is conducted in two stages and the nitrogen is admixed to the waste gases between the two expansion stages, wherein the waste gases, after the first expansion, but before the admixture with the nitrogen are reheated by indirect heat exchange with the gas produced in the auxiliary gasifier, and before the latter gas is cooled in a scrubber-cooler.

9. A process according to claim 2, wherein the waste gases are expanded from 10 to 20 bars to about 5 to 10 bars in the first stage of expansion and then to about 1.2 to 5 bars in the second stage of expansion.

10. A process according to claim 1, wherein the volumetric ratio of added nitrogen to the waste gas in the mixture thereof is about 0.5 : 1 to about 5 : 1.

11. A process according to claim 1, wherein the volumetric ratio of added nitrogen to the waste gas in the mixture thereof is about 2 : 1 to 5 : 1.

12. A process according to claim 1 wherein the waste gases prior to the admixing step, are at a temperature of 800–1000° C.

* * * * *